United States Patent
Zhou et al.

(10) Patent No.: US 10,530,258 B1
(45) Date of Patent: Jan. 7, 2020

(54) PREDICTIVE DEAD TIME GENERATING CIRCUIT

(71) Applicant: University of Electronic Science and Technology of China, Chengdu (CN)

(72) Inventors: Zekun Zhou, Chengdu (CN); Yunkun Wang, Chengdu (CN); Yandong Yuan, Chengdu (CN); Shilei Li, Chengdu (CN); Zhuo Wang, Chengdu (CN); Bo Zhang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 16/392,664

(22) Filed: Apr. 24, 2019

(30) Foreign Application Priority Data

Jan. 21, 2019 (CN) .......................... 2019 1 0051593

(51) Int. Cl.
*H02M 1/38* (2007.01)
*H02M 3/158* (2006.01)
*H02M 1/00* (2006.01)
*H02M 3/156* (2006.01)

(52) U.S. Cl.
CPC ........... *H02M 3/1588* (2013.01); *H02M 1/38* (2013.01); *H02M 3/156* (2013.01); *H02M 2001/0032* (2013.01)

(58) Field of Classification Search
CPC ............... H02M 3/156; H02M 3/1563; H02M 2003/1566; H02M 3/157; H02M 1/38; H02M 2011/385; H02M 3/1588; H02M 2001/0032
See application file for complete search history.

(56) References Cited

U.S. PATENT DOCUMENTS

| | | | | |
|---|---|---|---|---|
| 2008/0278125 A1* | 11/2008 | Pigott | ..................... | H02M 1/38 323/271 |
| 2008/0309302 A1* | 12/2008 | Chen | ....................... | H02M 1/38 323/282 |
| 2009/0273957 A1* | 11/2009 | Feldtkeller | .............. | H02M 1/38 363/98 |
| 2012/0105039 A1* | 5/2012 | Brown | ..................... | H02M 1/38 323/283 |
| 2013/0063984 A1* | 3/2013 | Sandner | .................. | H02M 1/38 363/20 |
| 2015/0349762 A1* | 12/2015 | Kinder | ................... | H03K 5/159 327/108 |
| 2016/0248412 A1* | 8/2016 | Kadowaki | ............ | H03K 17/165 |
| 2017/0187284 A1* | 6/2017 | Vaidya | ................ | H02M 3/1588 |
| 2018/0331682 A1* | 11/2018 | Duduman | ............ | H03K 17/063 |

* cited by examiner

*Primary Examiner* — Alex Torres-Rivera
(74) *Attorney, Agent, or Firm* — Gokalp Bayramoglu

(57) ABSTRACT

A predictive dead time generating circuit includes a dead time detecting module configured to detect a dead time between the switching off of the upper power transistor and the switching on of the lower power transistor, and a dead time between the switching off of the lower power transistor and the switching on of the upper power transistor, and to generate a first detecting signal and a second detecting signal according to the condition of whether the detected dead time reaches an optimal value. The logic control module changes the output of the delay module according to the judgment result of the dead time detecting module, so as to change the dead time between the driving signal of the upper power transistor and the driving signal of the lower power transistor.

9 Claims, 6 Drawing Sheets

PREDICTIVE DEAD TIME GENERATING CIRCUIT

CROSS REFERENCE TO THE RELATED APPLICATIONS

This application is based upon and claims priority to Chinese Patent Application No. 201910051593.7, filed on Jan. 21, 2019, the entire contents of which are incorporated herein by reference.

TECHNICAL FIELD

The present invention belongs to the technical field of electronic circuits, and specifically relates to a predictive dead time generating circuit, which can be used to control a DC-DC converter.

BACKGROUND

As the battery size of electronic devices is getting smaller and smaller and the voltage is getting lower and lower, the requirements for a working efficiency of the switching mode power supply are getting higher and higher. Various techniques have been applied in the technology of the switching mode power supply to increase the efficiency. Among them, regarding the synchronous rectification technique, a metal oxide semiconductor field effect transistor (MOSFET) with a low on-state voltage drop is used to realize the rectification instead of the traditional diode, so as to reduce the conduction loss of the switching mode power supply system and improve the conversion efficiency of the switching mode power supply system. Since the MOSFET does not have the characteristic of unidirectional conduction as the diode does, it is necessary to insert a dead time between the on and off switching of the upper power transistor and the lower power transistor. During this dead time, both of the two transistors are turned off to avoid any damages to the power transistors.

A conventional dead time generating circuit with fixed dead time is shown in FIG. 1. The PWM signal is a pulse width modulation signal of the DC-DC converter, P_Ctrl is a gate drive logic signal of the upper power transistor, and N_Ctrl is a gate drive logic signal of the lower power transistor.

When the PWM is flipped from low level to high level, the P_Ctrl gets delayed by ten gate circuits including inverters INV9, INV1, INV2, INV3, INV4, NAD2, INV5, INV6 and INV7 and an NAND gate NAD1 to get flipped from low level to high level. While, the N_Ctrl to be flipped from high level to low level only gets delayed by five gate circuits including the inverters INV9, INV1, INV2, INV3 and the NAND gate NAD1. A time margin is formed between the rising edge of the P_Ctrl and the falling edge of the N_Ctrl.

Similarly, when the PWM is flipped from high level to low level, the rising edge of the N_Ctrl is delayed by nine gate circuits including NAND gates NAD2 and NAD1, and the inverters INV5, INV6, INV7, INV8, INV1, INV2, and INV3. While, the falling edge of the P_Ctrl is only delayed by four gate circuits including the NAND gate NAD2 and the inverters INV5, INV6, and INV7. Another time margin is formed between the falling edge of the P_Ctrl and the rising edge of the N_Ctrl. As being delayed by different numbers of gate circuits, a dead time is formed between the output signals of the N_Ctrl and P_Ctrl.

The advantage of the fixed dead time is the simplicity. The disadvantage of the fixed dead time is that the fixed dead time should be long enough to meet the need of avoiding shoot-through under different temperatures and different process corners, etc. Since the body diode of the synchronous rectifying transistor is turned on during the dead time, a large power consumption will be caused and the efficiency of the system will be affected by using the fixed dead time technique. Therefore, although the fixed dead time technique can prevent the power transistor from getting burnout, the dead time is not the optimal value, and the power consumption is large, thereby limiting the overall efficiency of the converter.

SUMMARY

In view of the problem that the dead time of the conventional fixed dead time generating circuit cannot reach the optimal value, so that the power consumption is large, the present invention provides a predictive dead time generating circuit, which not only ensures the time margin of the dead time, but also optimizes the duration of the dead time, thereby reducing the power consumption.

The technical solution of the present invention is as follows.

A predictive dead time generating circuit which sets a dead time by controlling an upper power transistor and a lower power transistor of a DC-DC converter including:

a dead time detecting module, a logic control module, and a delay module.

The dead time detecting module is configured to detect a dead time between a switching off of the upper power transistor and a switching on of the lower power transistor and dead time between a switching off of the lower power transistor and a switching on of the upper power transistor to generate a first detecting signal and a second detecting signal. The first detecting signal generates a high-level pulse when a detected dead time between the switching off of the upper power transistor and the switching on of the lower power transistor is excessive, otherwise the first detecting signal has a low-level pulse. And the second detecting signal generates a high-level pulse when a detected dead time between the switching off of the lower power transistor and the switching on of the upper power transistor is excessive, otherwise the second detecting signal has a low-level pulse.

The delay module includes M cascading first delay units, wherein M is a positive integer. An inversion signal of a pulse width modulation signal of the DC-DC converter generates M delay signals by the M cascading first delay units, wherein a delay signal generated by the last cascading first delay unit is used as an output signal of the delay module.

The logic control module includes a counting logic unit, a delay selecting unit, and a dead time generating module.

The counting logic unit includes a first bidirectional counter and a second bidirectional counter. When the second detecting signal has a low-level pulse, the first bidirectional counter decreases one count in a down direction. When the second detecting signal has a high-level pulse and the output signal of the delay module has a low-level pulse, the first bidirectional counter increments one count in an up direction. When the first detecting signal has a low-level pulse, the second bidirectional counter decreases one count in a down direction. When the first detecting signal has a high-level pulse and the output signal of the delay module has a high-level pulse, the second bidirectional counter increments one count in an up direction.

The delay selecting unit includes two decoders and two multiplexers. The first decoder is configured to convert an output code of the first bidirectional counter into a first control code of M bits. The first multiplexer is configured to select a corresponding delay signal from the M delay signals as the first control signal according to the first control code of M bits. The second decoder is configured to convert an output code of the second bidirectional counter into a second control code of M bits. The second multiplexer is configured to select a corresponding delay signal from the M delay signals as a second control signal according to the second control code of M bits.

The dead time generating module is configured to invert an output signal of the delay module to use as a driving signal of the upper power transistor, and to generate a driving signal of the lower power transistor according to the first control signal and the second control signal generated by the delay selecting unit. The first control signal generates a third control signal after being delayed for a time equal to a total delay time of the delay module. A rising edge of the driving signal of the lower power transistor is the same as a rising edge of the third control signal, and a falling edge of the driving signal of the lower power transistor is the same as a falling edge of the second control signal.

Specifically, when the dead time generating circuit is applied to a step-down (BUCK) converter, the dead time detecting module includes a first detecting unit and a second detecting unit. The first detecting unit and the second detecting unit are configured to generate the first detecting signal and the second detecting signal, respectively.

The second detecting unit includes a first NMOS transistor, a second NMOS transistor, a third NMOS transistor, a fourth NMOS transistor, a fifth NMOS transistor, a sixth NMOS transistor, a first PMOS transistor, a second PMOS transistor, a third PMOS transistor, a fourth PMOS transistor, a fifth PMOS transistor, a sixth PMOS transistor, a seventh PMOS transistor, an eighth PMOS transistor, a ninth PMOS transistor, a first resistor, and a first inverter, wherein the fourth NMOS transistor and the fifth NMOS transistor have the same bias current.

One terminal of the first resistor is connected to a signal at a switch node of the BUCK converter, and the other terminal of the first resistor is connected to a source terminal of the sixth NMOS transistor.

A gate terminal and a drain terminal of the first NMOS transistor are short-circuited and connected to gate terminals of the second NMOS transistor and the third NMOS transistor, and the bias current. A source terminal of the first NMOS transistor is connected to the source terminals of the second NMOS transistor, the third NMOS transistor, and the fourth NMOS transistor and grounded.

A gate terminal and a drain terminal of the first PMOS transistor are short-circuited and connected to gate terminals of the third PMOS transistor, the fifth PMOS transistor, the seventh PMOS transistor, and the ninth PMOS transistor, and a drain terminal of the second NMOS transistor. A source terminal of the first PMOS transistor is connected to the source terminals of the second PMOS transistor, the fourth PMOS transistor, the sixth PMOS transistor, and the eighth PMOS transistor are connected to a power supply voltage.

A source terminal of the third PMOS transistor is connected to a drain terminal of the second PMOS transistor, and the drain terminal of the third PMOS transistor is connected to gate terminals of the second PMOS transistor, the fourth PMOS transistor, the sixth PMOS transistor, and the eighth PMOS transistor, and a drain terminal of the third NMOS transistor.

A gate terminal of the fifth NMOS transistor is connected to a gate terminal and a drain terminal of the fourth NMOS transistor and a drain terminal of the fifth PMOS transistor. A drain terminal of the fifth NMOS transistor is connected to a drain terminal of the seventh PMOS transistor and a gate terminal of the sixth NMOS transistor to output the second detecting signal after the first inverter. A source terminal of the fifth NMOS transistor is connected to drain terminals of the sixth NMOS transistor and the ninth PMOS transistor.

A drain terminal of the fourth PMOS transistor is connected to a source terminal of the fifth PMOS transistor, a drain terminal of the sixth PMOS transistor is connected to a source terminal of the seventh PMOS transistor, and a drain terminal of the eighth PMOS transistor is connected to a source terminal of the sixth PMOS transistor.

Specifically, the first detecting unit includes two Schmitt triggers and one NOR gate. Input terminals of the two Schmitt triggers are respectively connected to the signal at the switch node of the BUCK converter and the driving signal of the lower power transistor. Output terminals of the two Schmitt triggers are respectively connected to two input terminals of the NOR gate, and an output terminal of the NOR gate outputs the first detecting signal.

Specifically, the delay module includes a delay chain formed by cascading sixteen first delay units with a delay time of 4 ns.

Specifically, the counting logic unit further includes a second inverter, a third inverter, a fourth inverter, a fifth inverter, a sixth inverter, a seventh inverter, an eighth inversion, a ninth inverter, a tenth inverter, an eleventh inverter, a twelfth inverter, and a thirteenth inverter.

An input terminal of the second inverter is connected to an output signal of the delay module, and an output terminal of the second inverter is connected to input terminals of the third inverter and the fourth inverter.

An enable terminal of the fourth inverter is connected to the second detecting signal, and an output terminal of the fourth inverter is connected to an output terminal of the fifth inverter and an input terminal of the sixth inverter.

An input terminal of the seventh inverter is connected to an input terminal of the fifth inverter and an output terminal of the sixth inverter, and an output terminal of the seventh inverter is connected to a control terminal of the first bidirectional counter through the eighth inverter.

A clock terminal of the first bidirectional counter is connected to a delay signal generated by the fourteenth cascading first delay unit in the delay module.

An input terminal of the ninth inverter is connected to the output terminal of the third inverter, an enable terminal of the ninth inverter is connected to the first detecting signal, and an output terminal of the ninth inverter is connected to an output terminal of the tenth inverter and an input terminal of the eleventh inverter.

An input terminal of the twelfth inverter is connected to an input terminal of the tenth inverter and an output terminal of the eleventh inverter, and an output terminal of the twelfth inverter is connected to a control terminal of the second bidirectional counter through the thirteenth inverter.

A clock terminal of the second bidirectional counter is connected to the pulse width modulation signal.

Specifically, the dead time generating module includes an inverter chain formed by an odd number of inverters. The inverter chain is configured to convert the output signal of the delay module into the driving signal of the upper power transistor.

The dead time generating module further includes a fourteenth inverter, a fifteenth inverter, a sixteenth inverter, a seventeenth inverter, an eighteenth inverter, a nineteenth inverter, a twentieth inversion, a twenty-first inverter, a twenty-second inverter, a twenty-third inverter, a twenty-fourth inverter, and a second delay unit with a delay time same as a total delay time of the delay module.

An input terminal of the second delay unit is connected to the first control signal, and an output terminal of the second delay unit generates the third control signal and is connected to an enable terminal of the eighteenth inverter after going through a cascading structure of the fourteenth inverter and the fifteenth inverter.

The second control signal is connected to an input terminal of the eighteenth inverter after going through a cascading structure of the sixteenth inverter and the seventeenth inverter.

The nineteenth inverter and the twentieth inverter form a latch structure. An input terminal of the nineteenth inverter is connected to output terminals of the eighteenth inverter and the twentieth inverter. An output terminal of the nineteenth inverter is connected to input terminals of the twentieth inverter and the twenty-first inverter.

An output terminal of the twenty-first inverter generates the driving signal of the lower power transistor after sequentially going through a cascading structure of the twenty-second inverter, the twenty-third inverter, and the twenty-fourth inverter.

The advantages of the present invention are as follows. A predictive dead time generating circuit provided by the present invention can ensure the time margin of the dead time by adjusting the dead time, while optimize the duration of the dead time, thereby reducing power consumption.

DETAILED DESCRIPTION OF THE EMBODIMENTS

The present invention will be described in the details below with references to the drawings and specific embodiments.

Figure 1:
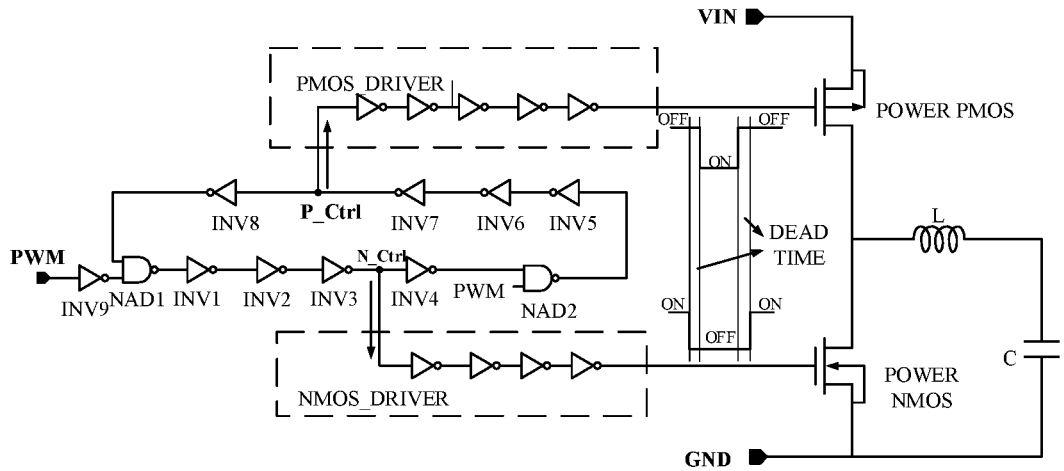
FIG. 1 is a structural schematic diagram of a conventional fixed dead time generating circuit.
Figure 2:
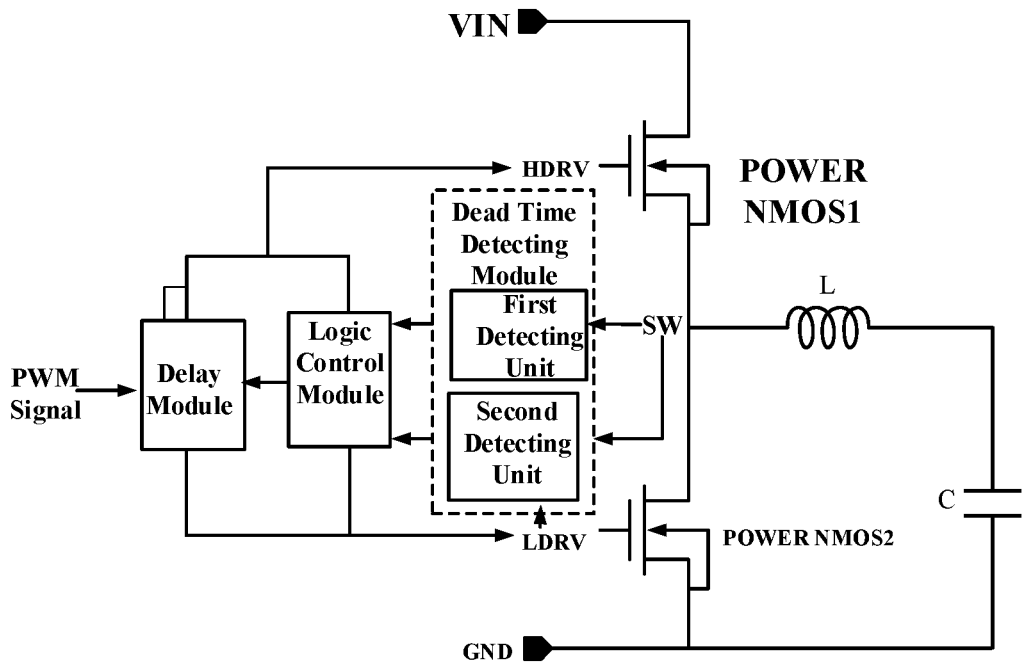
FIG. 2 is a topological structural diagram showing that a predictive dead time generating circuit of the present invention is applied to a DC-DC converter.

The idea of the predictive dead time generating circuit provided by the present invention is to determine whether the dead time reaches an optimum value according to working state of the preceding cycle, so as to determine whether the dead time of the next cycle should be increased or decreased. FIG. 2 shows a schematic diagram of a dead time detecting circuit. The predictive dead time generating circuit includes three parts: a dead time detecting module, a logic control module, and a delay module. The PWM signal of the DC-DC converter, after being delayed by the delay module, generates drive signal HDRV for the upper power transistor and drive signal LDRV for the lower power transistor in combination with the signal generated by the logic control module. The dead time detecting module is configured to detect the dead time between the switching off of the upper power transistor and the switching on of the lower power transistor, and the dead time between the switching off of the lower power transistor and the switching on of the upper power transistor. The first detecting signal D1 and the second detecting signal D2 are generated according to whether the detected dead time is optimal. The first detecting signal D1 generates a high-level pulse when the detected dead time between the switching off of the upper power transistor and the switching on of the lower power transistor is excessive, otherwise the first detecting signal D1 is a low-level pulse. The second detecting signal D2 generates a high-level pulse when the detected dead time between the switching off of the lower power transistor and the switching on of the upper power transistor is excessive, otherwise the second detecting signal D2 is a low-level pulse. The logic control module changes the output of the delay circuit according to the judgment result of the dead time detecting module, so as to change the dead time between drive signal HDRV for the upper power transistor and drive signal LDRV for the lower power transistor.

Now, taking an example that the predictive dead time generating circuit provided by the present invention is applied to a BUCK converter to explicitly illustrate the working process and working principle of the present embodiment, the structure of the dead time detecting module can be adjusted to be applicable to other DC-DC converters.

Figure 3:
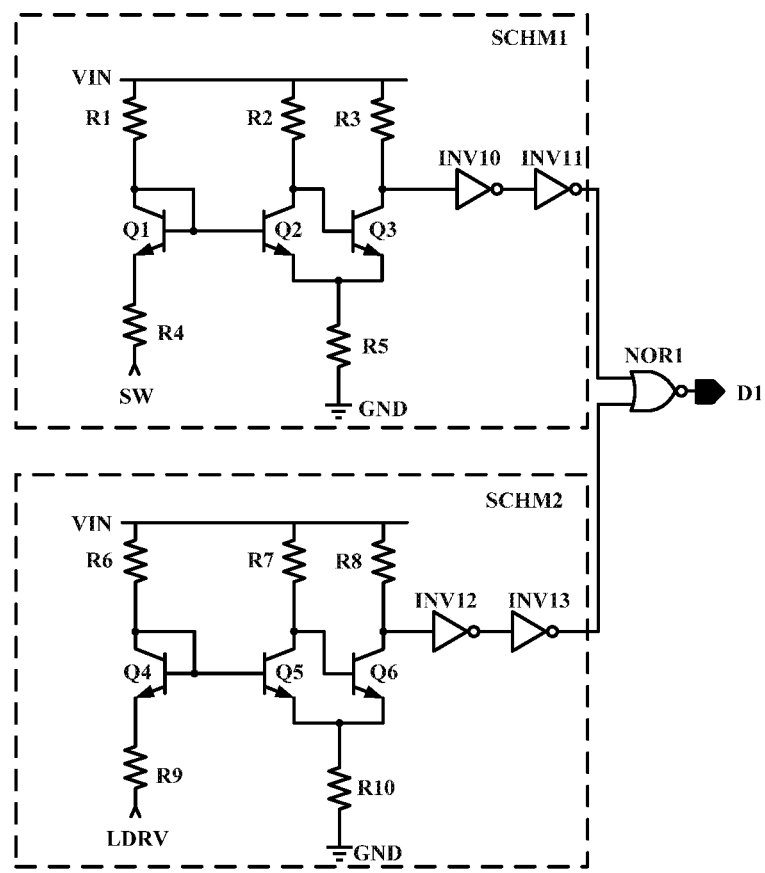
FIG. 3 is a structural schematic diagram of a first detecting circuit according to one embodiment.

In the present embodiment, the dead time detecting module generates the first detecting signal D1 and the second detecting signal D2 according to the signal SW at the switch node of the BUCK converter and the drive signal LDRV of the lower power transistor. An implementation mode of the first detecting circuit is shown in FIG. 3. The first detecting circuit is configured to detect the dead time between the switching off of the upper power transistor and the switching on of the lower power transistor. The first detecting circuit includes two Schmitt triggers, i.e. SCHM1 and SCHM2, and one NOR gate NOR1. The input terminals of the two Schmitt triggers are respectively connected to the signal SW at the switch node of the BUCK converter and the drive signal LDRV of the lower power transistor. The output terminals of the two Schmitt triggers are respectively connected to the two input terminals of NOR gate NOR1, and the output terminal of NOR gate NOR1 outputs the first detecting signal D1. The voltage levels of the SW point and the LDRV point are respectively detected by the two Schmitt triggers SCHM1 and SCHM2. When the upper power transistor is turned on, the voltage level of the SW point will be pulled to a higher level. When the LDRV point has a low voltage level, the lower power transistor will be turned off. If during the process when the upper power transistor is turned off while the lower power transistor is turned on, and the two Schmitt triggers simultaneously output a low voltage level, it indicates that the two power transistors may be simultaneously turned off, and it is determined by the detecting circuit that the dead time is too long, thus the first detecting signal D1 outputs a high-level pulse.

Figure 4:
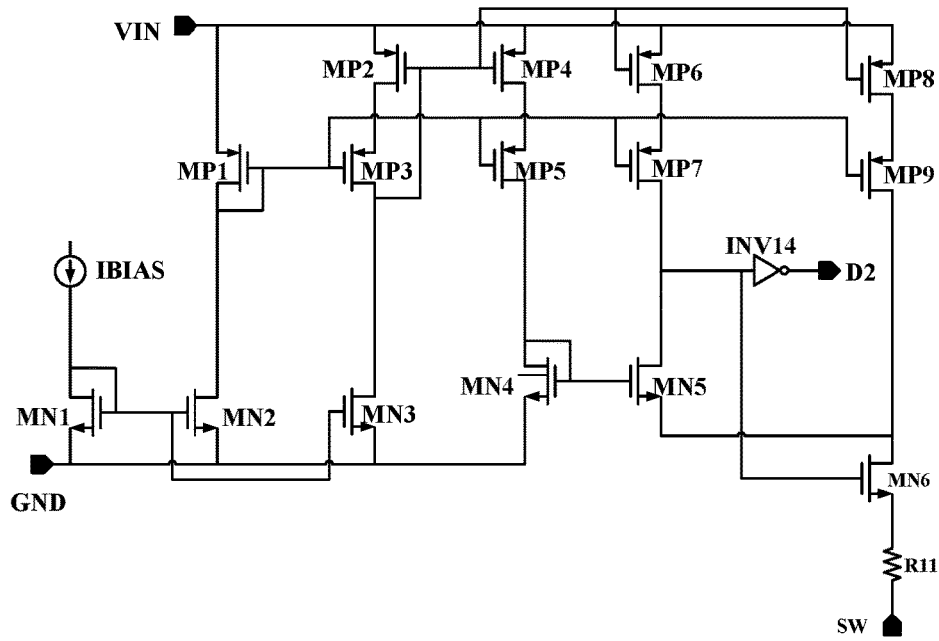
FIG. 4 is a structural schematic diagram of a second detecting circuit according to one embodiment.

As shown in FIG. 4, an implementation mode of the second detecting circuit is provided. The second detecting circuit is configured to detect the dead time between the switching off of the lower power transistor and the switching on of the upper power transistor. The second detecting circuit includes first NMOS transistor MN1, second NMOS transistor MN2, third NMOS transistor MN3, fourth NMOS transistor MN4, fifth NMOS transistor MN5, sixth NMOS transistor MN6, first PMOS transistor MP1, second PMOS transistor MP2, third PMOS transistor MP3, fourth PMOS transistor MP4, fifth PMOS transistor MP5, sixth PMOS transistor MP6, seventh PMOS transistor MP7, eighth PMOS transistor MP8, ninth PMOS transistor MP9, first resistor R11, and first inverter INV14. One terminal of first resistor R11 is connected to signal SW at the switch node of the BUCK converter, and the other terminal of first resistor R11 is connected to the source terminal of sixth NMOS transistor MN6. A gate terminal and a drain terminal of first NMOS transistor MN1 are short-circuited and connected to gate terminals of second NMOS transistor MN2 and third NMOS transistor MN3, and bias current IBIAS. A source terminal of first NMOS transistor MN1 is connected to source terminals of second NMOS transistor MN2, third NMOS transistor MN3 and fourth NMOS transistor MN4, and is connected to ground terminal GND. A gate terminal and a drain terminal of first PMOS transistor MP1 are short-circuited and connected to gate terminals of third PMOS transistor MP3, fifth PMOS transistor MP5, seventh PMOS transistor MP7, and ninth PMOS transistor MP9, and a drain terminal of second NMOS transistor MN2. A source terminal of first PMOS transistor MP1 is connected to source terminals of second PMOS transistor MP2, fourth PMOS transistor MP4, sixth PMOS transistor MP6, and eighth PMOS transistor MP8, and is connected to a power supply voltage VIN. A source terminal of third PMOS transistor MP3 is connected to a drain terminal of second PMOS transistor MP2. A drain terminal of third PMOS transistor MP3 is connected to gate terminals of second PMOS transistor MP2, fourth PMOS transistor MP4, sixth PMOS transistor MP6, and eighth PMOS transistor MP8, and a drain terminal of third NMOS transistor MN3. A gate terminal of fifth NMOS transistor MN5 is connected to a gate terminal and a drain terminal of fourth NMOS transistor MN4 and a drain terminal of fifth PMOS transistor MP5. A drain terminal of fifth NMOS transistor MN5 is connected to a drain terminal of seventh PMOS transistor MP7 and a gate terminal of sixth NMOS transistor MN6 and outputs a second detecting signal D2 after going through the first inverter INV14. A source terminal of fifth NMOS transistor MN5 is connected to the drain terminals of sixth NMOS transistor MN6 and ninth PMOS transistor MP9. A drain terminal of fourth PMOS transistor MP4 is connected to a source terminal of fifth PMOS transistor MP5. A drain terminal of sixth PMOS transistor MP6 is connected to a source terminal of seventh PMOS transistor MP7. A drain terminal of eighth PMOS transistor MP8 is connected to a source terminal of sixth PMOS transistor MP6.

First PMOS transistor MP1, second PMOS transistor MP2, third PMOS transistor MP3, fourth PMOS transistor MP4, fifth PMOS transistor MP5, sixth PMOS transistor MP6, seventh PMOS transistor MP7, eighth PMOS transistor MP8, and ninth PMOS transistor MP9 form a current mirror with a low voltage, a common source terminal, and a common gate terminal to ensure the mirror accuracy of the current. Fourth NMOS transistor MN4 and fifth NMOS transistor MN5 form a transistor pair that inputs from the source terminal, and the two transistors have the same bias current, so that the two transistors have the same gate-source voltage when operating in the saturation region. The source terminal of fourth NMOS transistor MN4 is grounded, so if a potential of the source terminal of fifth NMOS transistor MN5 is higher than the ground potential, the second detecting signal D2 will output a low voltage level, and if the potential of the source terminal of fifth NMOS transistor MN5 is lower than the ground potential, the second detecting signal D2 will output a high voltage level. Sixth NMOS transistor MN6 and first resistor R11 are configured to determine the flip point of a comparator. Sixth NMOS transistor MN6 operates in the linear region and can be regarded as a positive temperature resistor for fitting the change of the conduction resistance of the power transistor. This is because when the Buck circuit operates normally, signal SW also has a negative voltage, and the negative voltage varies as the conduction resistance of the external conduction power transistor varies, thus the flip point needs to be set lower than the normal conduction voltage. At normal temperature, the flip point of the comparator is −360 mV. In the process of switching off the lower power transistor and switching on the upper power transistor, if the voltage of the SW point is lower than −360 mV, it is indicated that the dead time is excessive, then second detecting signal D2 will output a high-level pulse.

Figure 5:
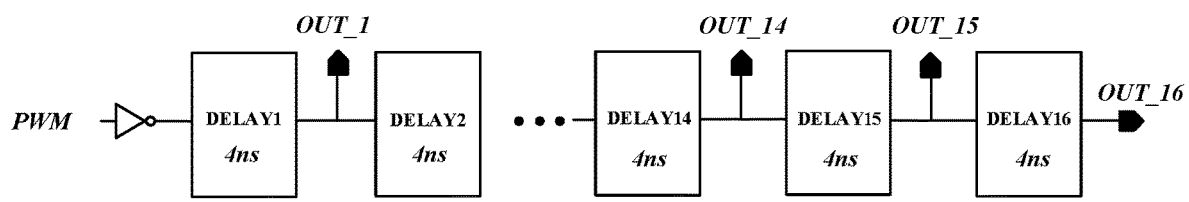
FIG. 5 is a structural schematic diagram of a delay circuit according to one embodiment.

An implementation mode of the delay module, i.e. a 16-bit 4-ns delay chain, is shown in FIG. 5. The inverted signal of pulse width modulation signal PWM generates sixteen delay signals from OUT_1 to OUT_16 when passing through a delay chain with a 4-ns unit delay, and the delay interval of each signal is 4 ns.

The digital control logic module can be divided into three parts. The first part is a counting logic unit, the second part is a delay selecting unit, and the third part is a dead time generating unit.

Figure 6:
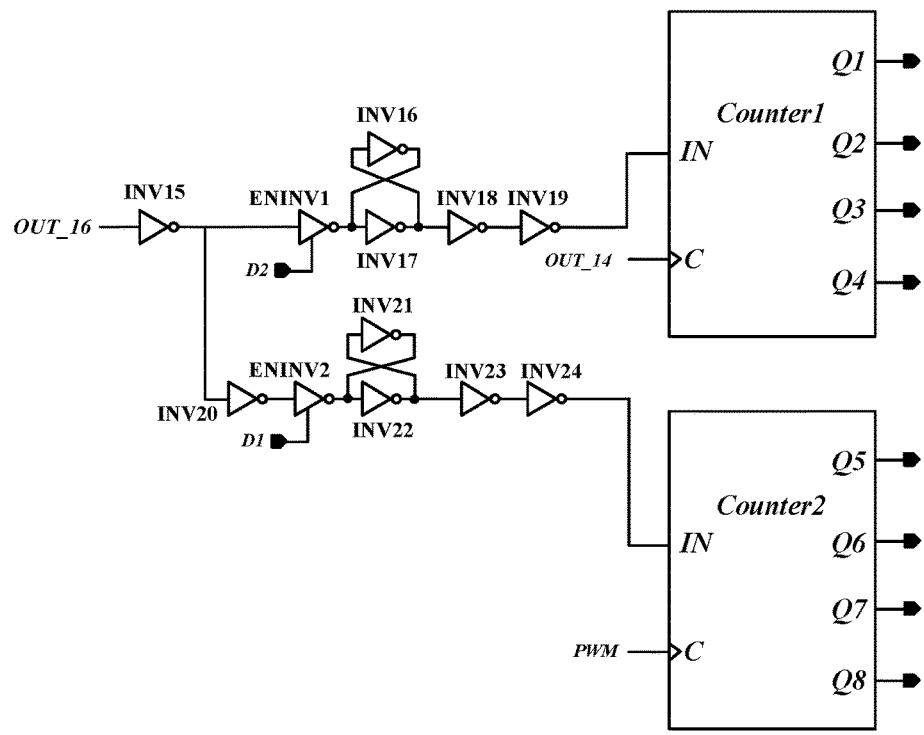
FIG. 6 is a structural schematic diagram showing a counting logic according to one embodiment.

An implementation mode of the counting logic unit is shown in FIG. 6. The counting logic unit includes second inverter INV15, third inverter INV20, fourth inverter ENINV1, fifth inverter INV16, sixth inverter INV17, seventh inverter INV18, eighth inverter INV19, ninth inverter ENINV2, tenth inverter INV21, eleventh inverter INV22, twelfth inverter INV23, thirteenth inverter INV24, first bidirectional counter Counter1, and second bidirectional counter Counter2. An input terminal of second inverter INV15 is connected to output signal OUT_16 of the delay module, and an output terminal of the second inverter INV15 is connected to the input terminals of third inverter INV20 and fourth inverter ENINV1. The enable terminal of fourth inverter ENINV1 is connected to second detecting signal D2, and the output terminal of fourth inverter ENINV1 is connected to an output terminal of the fifth inverter INV16 and an input terminal of sixth inverter INV17. An input terminal of seventh inverter INV18 is connected to an input terminal of the fifth inverter INV16 and an output terminal of sixth inverter INV17. An output terminal of seventh inverter INV18 is connected to a control terminal of the first bidirectional counter Counter1 through eighth inverter INV19. A clock terminal of first bidirectional counter Counter1 is connected to delay signal OUT_14 generated by the fourteenth cascading the first delay unit in the delay module. An input terminal of ninth inverter ENINV2 is connected to an output terminal of third inverter INV20, the enable terminal of ninth inverter ENINV2 is connected to first the detecting signal D1, and an output terminal of the ninth inverter ENINV2 is connected to an output terminal of the tenth inverter INV21 and the input terminal of eleventh inverter INV22. The input terminal of twelfth inverter INV23 is connected to the input terminal of tenth inverter INV21 and an output terminal of eleventh inverter INV22. The output terminal of twelfth inverter INV23 is connected to a control terminal of the second bidirectional counter Counter2 after going through thirteenth inverter INV24. A clock terminal of the second bidirectional counter Counter2 is connected to pulse width modulation signal PWM.

Figure 7:
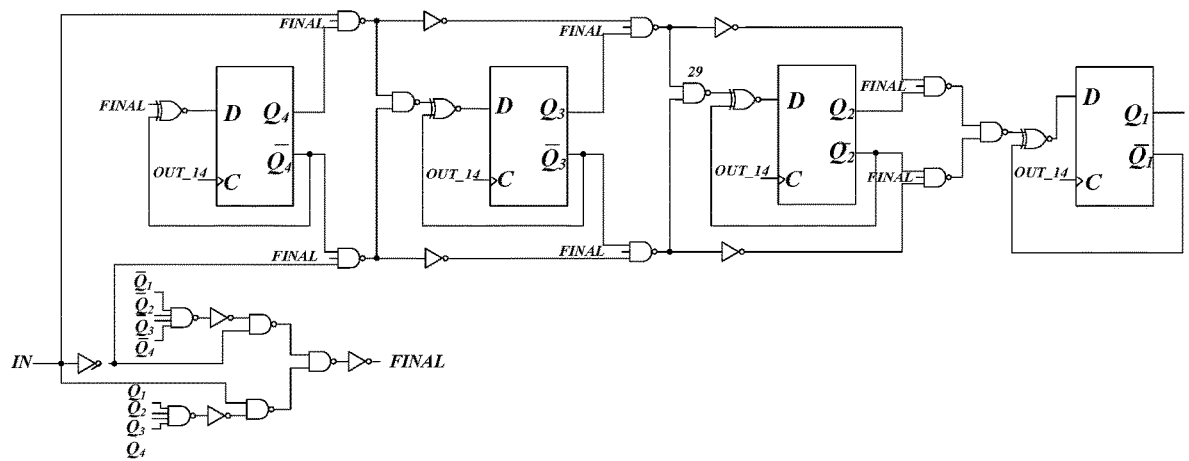
FIG. 7 is a structural schematic diagram of a bidirectional counter according to one embodiment.

When the voltage levels of the enable terminal and the input terminal of fourth inverter ENINV1 are both 1, the voltage level of the output is 0. When the voltage levels of the enable terminal and the input terminal are 0 or voltage level of the enable terminal is 0 and the voltage level of the input terminal is 1, the output is latched by fifth inverter INV16 and sixth inverter INV17. In other cases, the voltage level of the output is 1. A structure of the bidirectional counter is shown in FIG. 7, where IN refers to a counting terminal. When the voltage level of the input to IN is 1, the counting direction is addition. When the voltage level of the input to IN is 0, the counting direction is subtraction, and the counting pulse is input from the C terminal.

In the present embodiment, when the output signal of the delay module, i.e., the falling edge of delay signal OUT_16, comes along, if the voltage level of second detecting signal D2 is 1, the voltage level of control terminal IN of first bidirectional counter Counter1 is 1, and the counting direction of first bidirectional counter Counter1 is addition. Thus, when the rising edge of delay signal OUT_14 generated by the fourteenth cascading delay unit in the delay module comes along, the first bidirectional counter Counter1 increments one count. If the voltage level of the second detecting signal D2 is not 1, the voltage level of the control terminal IN of the first bidirectional counter Counter1 is 0, and the first bidirectional counter Counter1 decreases one count. In the present embodiment, the reason why delay signal OUT_14 generated by the fourteenth cascading delay unit is in the delay module is selected as the clock signal for the first bidirectional counter Counter1 is to ensure that after control terminal signal IN1 changes in each cycle of the first bidirectional counter Counter1, the clock signal, i.e., the rising edge pulse of OUT_14, again to adjusts the number of times of the first bidirectional counter Counter1.

When the output signal of the delay module, i.e., the rising edge of delay signal OUT_16, comes along, if the voltage level of the first detecting signal D1 is 1, the voltage level of control terminal signal IN of the second bidirectional counter Counter2 is 1, the counting direction has an addition, and the pulse width modulation signal PWM is used as the clock signal of the second bidirectional counter Counter2. When the rising edge of pulse width modulation signal PWM comes along, second bidirectional counter Counter2 increments one count. If the voltage level of the first detecting signal D1 is not 1, second bidirectional counter Counter2 decreases one count.

Figure 8:
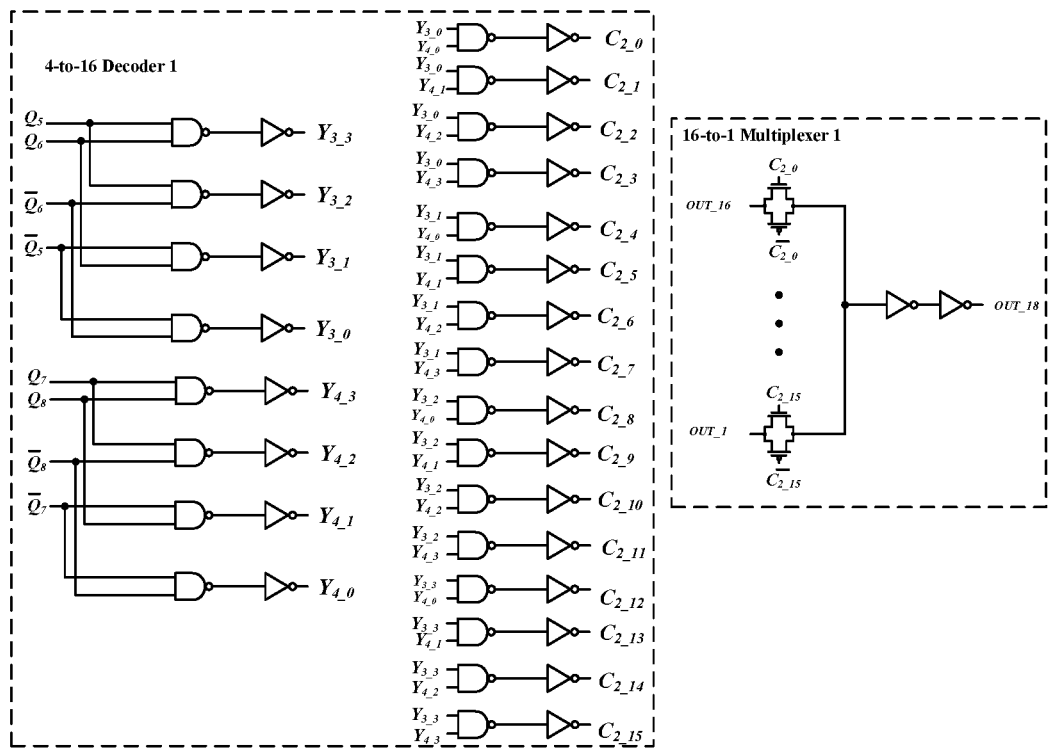
FIG. 8 is a structural schematic diagram of a delay selecting circuit according to one embodiment.
Figure 8:
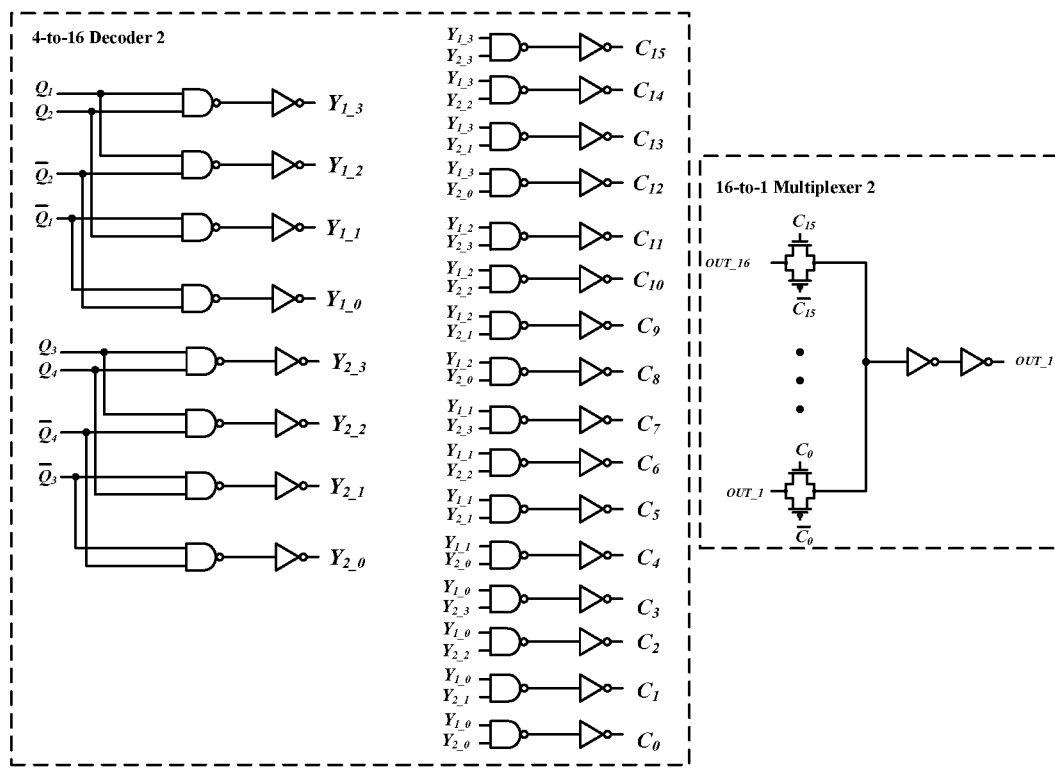

The structure of the delay selecting unit in the present embodiment is shown in FIG. 8. The delay selecting unit includes two 4-to-16 decoders and two 16-to-1 multiplexers. The two decoders decode the outputs of first bidirectional counter Counter1 and second bidirectional counter Counter2, respectively. Then, the first control signal OUT_18 and second control signal OUT_19 are obtained according to the corresponding signal selected by the 16-to-1 multiplexer from the sixteen delay signals from OUT_1 to OUT_16 generated by the delay module. The initial value of the first control signal OUT_18 is OUT_16, and the initial value of second control signal OUT_19 is OUT_1.

The dead time generating unit is configured to invert the output signal of the delay module, then use it as driving signal HDRV of the upper power transistor, and generate driving signal LDRV of the lower power transistor according to the first control signal OUT_18 and the second control signal OUT_19 generated by the delay selecting unit. First control signal OUT_18 generates third control signal OUT_20 after being delayed for the time equal to the total delay time of the delay module. The rising edge of the driving signal of the lower power transistor is the same as the rising edge of the third control signal OUT_20. The falling edge of the driving signal of the lower power transistor is the same as the falling edge of second control signal OUT_19.

Figure 9:
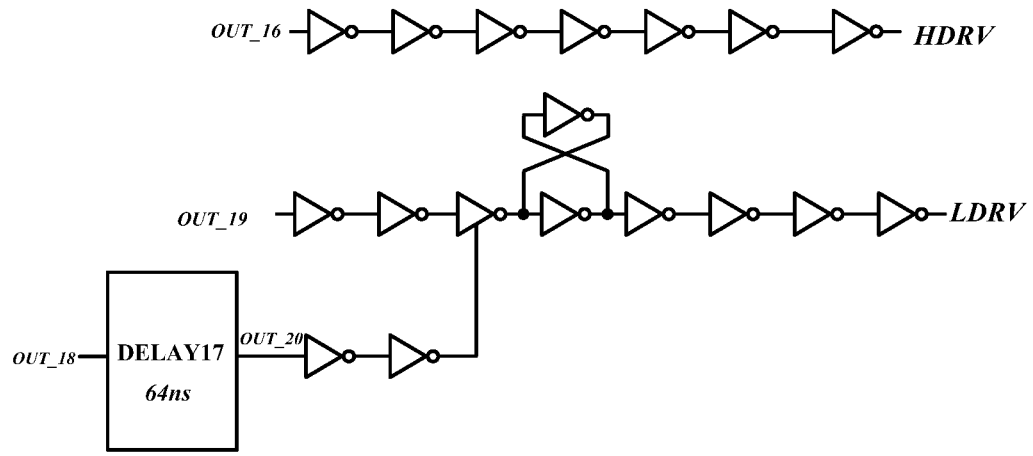
FIG. 9 is a structural schematic diagram of a dead time generating circuit according to one embodiment.

A circuit implementation mode of the dead time generating unit is shown in FIG. 9. The dead time generating unit includes an inverter chain composed of an odd number of inverters. The inverter chain is configured to convert output signal OUT_16 of the delay module into driving signal HDRV for the upper power transistor. The dead time generating module further includes a fourteenth inverter, a fifteenth inverter, a sixteenth inverter, a seventeenth inverter, an eighteenth inverter, a nineteenth inverter, a twentieth inverter, a twenty-first inverter, a twenty-second inverter, a twenty-third inverter, a twenty-fourth inverter, and a second delay unit. The delay time of the second delay unit is the total delay time of the delay module. In the present embodiment, since the delay module is formed by cascading sixteen 4-ns first delay units, the delay time of the second delay unit is 64 ns. The input terminal of the second delay unit is connected to first control signal OUT_18, and the output terminal of the second delay unit generates third control signal OUT_20 and is connected to the enable terminal of the eighteenth inverter after going through the cascading structure of the fourteenth inverter and the fifteenth inverter. Second control signal OUT_19 is connected to the input terminal of the eighteenth inverter after going through the cascading structure of the sixteenth inverter and the seventeenth inverter. The nineteenth inverter and the twentieth inverter form a latch structure. The input terminal of the nineteenth inverter is connected to the output terminals of the eighteenth inverter and the twentieth inverter, and the output terminal of the nineteenth inverter is connected to the input terminals of the twentieth inverter and the twenty-first inverter. The output terminal of the twenty-first inverter generates driving signal LDRV for the lower power transistor after sequentially going through the cascading structure of the twenty-second inverter, the twenty-third inverter, and the twenty-fourth inverter.

Figure 10:
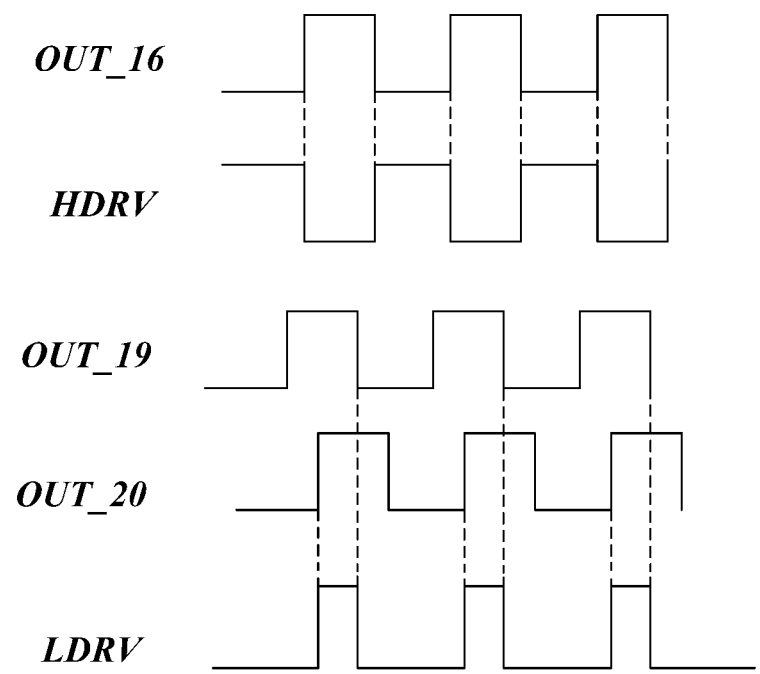
FIG. 10 is a waveform diagram of a dead time generating circuit according to the present embodiment.

First control signal OUT_18 generates third control signal OUT_20 after being delayed for 64 ns by the second delay unit. The rising edge of driving signal LDRV of the lower power transistor is determined by third control signal OUT_20, the falling edge of driving signal LDRV of the lower driving transistor is determined by second control signal OUT_19, and the waveform diagram is shown in FIG. 10. The dead time between the switching off of the upper power transistor and the switching on of the lower power transistor can be expressed as: 60 ns−counter2 output code×4 ns. The dead time between the switching off of the lower power transistor and the switching on of the upper power transistor can be expressed as: (16−counter1 output code)×4 ns. The predictive dead time generating circuit can finally reach the optimal value of the approximate zero dead zone, which not only avoids the shoot-through between the upper power transistor and the lower power transistor, but also improves the efficiency.

The above embodiments are merely used to illustrate the technical solutions of the present invention. It should be understood by those skilled in the art that the technical solutions of the present invention may be modified or equivalently substituted without departing from the spirit and scope of the present solutions. Such modifications and substitutions should be considered as falling within the scope of the present invention.

What is claimed is:

1. A predictive dead time generating circuit which sets a dead time by controlling an upper power transistor and a lower power transistor of a DC-DC converter, comprising: a dead time detecting module, a logic control module, and a delay module;

wherein, the dead time detecting module is configured to detect a first dead time between a switching off of the upper power transistor and a switching on of the lower power transistor, and a second dead time between a switching off of the lower power transistor and a switching on of the upper power transistor, to generate a first detecting signal and a second detecting signal; the first detecting signal generates a first high-level pulse when detecting the first dead time between the switching off of the upper power transistor and the switching on of the lower power transistor is excessive, otherwise the first detecting signal has a first low-level pulse; the second detecting signal generates a second high-level pulse when detecting the second dead time between the switching off of the lower power transistor and the switching on of the upper power transistor is excessive, otherwise the second detecting signal has a second low-level pulse;

the delay module comprises M cascading first delay units, wherein M is a positive integer; an inversion signal of a pulse width modulation signal of the DC-DC converter generates M delay signals by the M cascading first delay units, wherein a delay signal generated by a last cascading first delay unit of the M cascading first delay units is used as an output signal of the delay module;

the logic control module comprises a counting logic unit, a delay selecting unit, and a dead time generating module;

wherein, the counting logic unit comprises a first bidirectional counter and a second bidirectional counter; when the second detecting signal has the second low-level pulse, the first bidirectional counter decrements by one count; when the second detecting signal has the second high-level pulse and the output signal of the delay module has a third low-level pulse, the first bidirectional counter increments by one count; when the first detecting signal has the first low-level pulse, the second bidirectional counter decrements by one count; when the first detecting signal has a high-level pulse and the output signal of the delay module has a third high-level pulse, the second bidirectional counter increments by one count;

the delay selecting unit comprises a first decoder, a second decoder, a first multiplexer, and a second multiplexer; the first decoder is configured to convert an output code of the first bidirectional counter into a first control code of M bits; the first multiplexer is configured to select a first corresponding delay signal from the M delay signals as a first control signal according to the first control code of M bits; the second decoder is configured to convert an output code of the second bidirectional counter into a second control code of M bits; the second multiplexer is configured to select a second corresponding delay signal from the M delay signals as a second control signal according to the second control code of M bits;

the dead time generating module is configured to invert an output signal of the delay module to use as a driving signal of the upper power transistor, and to generate a driving signal of the lower power transistor according to the first control signal and the second control signal generated by the delay selecting unit; the first control signal generates a third control signal after being delayed for a time equal to a total delay time of the delay module; a rising edge of the driving signal of the lower power transistor is same as a rising edge of the third control signal, and a falling edge of the driving signal of the lower power transistor is same as a falling edge of the second control signal.

2. The predictive dead time generating circuit of claim 1, wherein, when the dead time generating circuit is applied to a step-down (BUCK) converter, the dead time detecting module comprises a first detecting unit and a second detecting unit; the first detecting unit and the second detecting unit are configured to generate the first detecting signal and the second detecting signal, respectively;

the second detecting unit comprises a first NMOS transistor, a second NMOS transistor, a third NMOS transistor, a fourth NMOS transistor, a fifth NMOS transistor, a sixth NMOS transistor, a first PMOS transistor, a second PMOS transistor, a third PMOS transistor, a fourth PMOS transistor, a fifth PMOS transistor, a sixth PMOS transistor, a seventh PMOS transistor, an eighth PMOS transistor, a ninth PMOS transistor, a first resistor, and a first inverter, wherein the fourth NMOS transistor and the fifth NMOS transistor have a same bias current;

one terminal of the first resistor is connected to a signal at a switch node of the BUCK converter, and an other terminal of the first resistor is connected to a source terminal of the sixth NMOS transistor;

a gate terminal and a drain terminal of the first NMOS transistor are short-circuited and connected to gate terminals of the second NMOS transistor and the third NMOS transistor, and a bias current; a source terminal of the first NMOS transistor is connected to source terminals of the second NMOS transistor, the third NMOS transistor, and the fourth NMOS transistor and grounded;

a gate terminal and a drain terminal of the first PMOS transistor are short-circuited and connected to gate terminals of the third PMOS transistor, the fifth PMOS transistor, the seventh PMOS transistor, and the ninth PMOS transistor, and a drain terminal of the second NMOS transistor; a source terminal of the first PMOS transistor is connected to source terminals of the second PMOS transistor, the fourth PMOS transistor, the sixth PMOS transistor, and the eighth PMOS transistor and is connected to a power supply voltage;

a source terminal of the third PMOS transistor is connected to a drain terminal of the second PMOS transistor, and a drain terminal of the third PMOS transistor is connected to gate terminals of the second PMOS transistor, the fourth PMOS transistor, the sixth PMOS transistor, and the eighth PMOS transistor, and a drain terminal of the third NMOS transistor;

a gate terminal of the fifth NMOS transistor is connected to a gate terminal and a drain terminal of the fourth NMOS transistor and a drain terminal of the fifth PMOS transistor; a drain terminal of the fifth NMOS transistor is connected to a drain terminal of the seventh PMOS transistor and a gate terminal of the sixth NMOS transistor to output the second detecting signal after the first inverter; a source terminal of the fifth NMOS transistor is connected to drain terminals of the sixth NMOS transistor and the ninth PMOS transistor; and a drain terminal of the fourth PMOS transistor is connected to a source terminal of the fifth PMOS transistor, a drain terminal of the sixth PMOS transistor is connected to a source terminal of the seventh PMOS transistor, and a drain terminal of the eighth PMOS transistor is connected to a source terminal of the sixth PMOS transistor.

3. The predictive dead time generating circuit of claim 2, wherein, the first detecting unit comprises two Schmitt triggers and one NOR gate; input terminals of the two Schmitt triggers are respectively connected to the signal at the switch node of the BUCK converter and the driving signal of the lower power transistor; output terminals of the two Schmitt triggers are respectively connected to two input terminals of the NOR gate, and an output terminal of the NOR gate outputs the first detecting signal.

4. The predictive dead time generating circuit of claim 3, wherein, the delay module comprises a delay chain formed by cascading sixteen first delay units each having a delay time of 4 ns.

5. The predictive dead time generating circuit of claim 2, wherein, the delay module comprises a delay chain formed by cascading sixteen first delay units each having a delay time of 4 ns.

6. The predictive dead time generating circuit of claim 1, wherein, the delay module comprises a delay chain formed by cascading sixteen first delay units each having a delay time of 4 ns.

7. The predictive dead time generating circuit of claim 6, wherein, the counting logic unit further comprises a second inverter, a third inverter, a fourth inverter, a fifth inverter, a sixth inverter, a seventh inverter, an eighth inverter, a ninth inverter, a tenth inverter, an eleventh inverter, a twelfth inverter, and a thirteenth inverter;

an input terminal of the second inverter is connected to an output signal of the delay module, and an output terminal of the second inverter is connected to input terminals of the third inverter and the fourth inverter;

an enable terminal of the fourth inverter is connected to the second detecting signal, and an output terminal of the fourth inverter is connected to an output terminal of the fifth inverter and an input terminal of the sixth inverter;

an input terminal of the seventh inverter is connected to an input terminal of the fifth inverter and an output terminal of the sixth inverter, and an output terminal of the seventh inverter is connected to a control terminal of the first bidirectional counter through the eighth inverter;

a clock terminal of the first bidirectional counter is connected to a delay signal generated by a fourteenth cascading first delay unit of the M cascading first delay units in the delay module;

an input terminal of the ninth inverter is connected to an output terminal of the third inverter, an enable terminal of the ninth inverter is connected to the first detecting signal, and an output terminal of the ninth inverter is connected to an output terminal of the tenth inverter and an input terminal of the eleventh inverter;

an input terminal of the twelfth inverter is connected to an input terminal of the tenth inverter and an output terminal of the eleventh inverter, and an output terminal of the twelfth inverter is connected to a control terminal of the second bidirectional counter through the thirteenth inverter; and a clock terminal of the second bidirectional counter is connected to the pulse width modulation signal.

8. The predictive dead time generating circuit of claim 7, wherein, the dead time generating module comprises an inverter chain formed by an odd number of inverters, and the inverter chain is configured to convert the output signal of the delay module into the driving signal of the upper power transistor;

the dead time generating module further comprises a fourteenth inverter, a fifteenth inverter, a sixteenth inverter, a seventeenth inverter, an eighteenth inverter, a nineteenth inverter, a twentieth inversion, a twenty-first inverter, a twenty-second inverter, a twenty-third inverter, a twenty-fourth inverter, and a second delay unit with a delay time is same as the total delay time of the delay module;

an input terminal of the second delay unit is connected to the first control signal, and an output terminal of the second delay unit generates the third control signal and is connected to an enable terminal of the eighteenth inverter after going through a cascading structure of the fourteenth inverter and the fifteenth inverter;

the second control signal is connected to an input terminal of the eighteenth inverter after going through a cascading structure of the sixteenth inverter and the seventeenth inverter;

the nineteenth inverter and the twentieth inverter form a latch structure, and an input terminal of the nineteenth inverter is connected to output terminals of the eighteenth inverter and the twentieth inverter, and an output terminal of the nineteenth inverter is connected to input terminals of the twentieth inverter and the twenty-first inverter; and an output terminal of the twenty-first inverter generates the driving signal of the lower power transistor after sequentially going through a cascading structure of the twenty-second inverter, the twenty-third inverter, and the twenty-fourth inverter.

9. The predictive dead time generating circuit of claim 1, wherein, the dead time generating module comprises an inverter chain formed by an odd number of inverters, and the inverter chain is configured to convert the output signal of the delay module into the driving signal of the upper power transistor;

the dead time generating module further comprises a fourteenth inverter, a fifteenth inverter, a sixteenth inverter, a seventeenth inverter, an eighteenth inverter, a nineteenth inverter, a twentieth inversion, a twenty-first inverter, a twenty-second inverter, a twenty-third inverter, a twenty-fourth inverter, and a second delay unit with a delay time same as the total delay time of the delay module;

an input terminal of the second delay unit is connected to the first control signal, and an output terminal of the second delay unit generates the third control signal and is connected to an enable terminal of the eighteenth inverter after going through a cascading structure of the fourteenth inverter and the fifteenth inverter;

the second control signal is connected to an input terminal of the eighteenth inverter after going through a cascading structure of the sixteenth inverter and the seventeenth inverter;

the nineteenth inverter and the twentieth inverter form a latch structure, and an input terminal of the nineteenth inverter is connected to output terminals of the eighteenth inverter and the twentieth inverter, and an output terminal of the nineteenth inverter is connected to input terminals of the twentieth inverter and the twenty-first inverter; and an output terminal of the twenty-first inverter generates the driving signal of the lower power transistor after sequentially going through a cascading structure of the twenty-second inverter, the twenty-third inverter, and the twenty-fourth inverter.

* * * * *